United States Patent
Park

(10) Patent No.: US 9,683,641 B2
(45) Date of Patent: Jun. 20, 2017

(54) APPARATUS FOR DRIVING LINKS

(71) Applicant: Hyundai Motor Company, Seoul (KR)

(72) Inventor: Jun Hwan Park, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 58 days.

(21) Appl. No.: 14/522,296

(22) Filed: Oct. 23, 2014

(65) Prior Publication Data

US 2015/0330485 A1     Nov. 19, 2015

(30) Foreign Application Priority Data

May 16, 2014     (KR) .......................... 10-2014-0059147

(51) Int. Cl.
| | |
|---|---|
| *F16H 21/40* | (2006.01) |
| *B25J 9/10* | (2006.01) |
| *F16H 19/00* | (2006.01) |
| *F16H 19/06* | (2006.01) |

(52) U.S. Cl.
CPC .............. *F16H 21/40* (2013.01); *B25J 9/104* (2013.01); *F16H 19/005* (2013.01); *F16H 2019/0695* (2013.01); *Y10T 74/18152* (2015.01)

(58) Field of Classification Search
CPC ........ B25J 15/083; B25J 9/104; B25J 9/1045; F16D 27/118; F16D 2011/002; B65H 2403/70
USPC ..................................................... 74/490.04
See application file for complete search history.

(56) References Cited

U.S. PATENT DOCUMENTS

| | | | | |
|---|---|---|---|---|
| 4,716,785 A | * | 1/1988 | Godai .................... | B25J 9/0081 74/606 R |
| 2006/0154763 A1 | * | 7/2006 | Serkh ...................... | F02B 67/06 474/59 |
| 2012/0132018 A1 | * | 5/2012 | Tang ....................... | A61B 19/22 74/29 |

FOREIGN PATENT DOCUMENTS

| | | |
|---|---|---|
| JP | H11-28689 | 2/1999 |
| JP | 2003-211383 A | 7/2003 |
| JP | 2003-305681 A | 10/2003 |
| KR | 10-2007-0065493 | 6/2007 |

* cited by examiner

*Primary Examiner* — William Kelleher
*Assistant Examiner* — Gregory Prather
(74) *Attorney, Agent, or Firm* — Mintz Levin Cohn Ferris Glovsky and Popeo, P.C.; Peter F. Corless

(57) ABSTRACT

An apparatus for driving links is provided and includes a base onto which an actuator is installed and a plurality of connection links connected to the base via a plurality of hinge pins, and the respective end of which is connected via the hinge pin to form a series of a driving lines. A plurality of capstans are disposed on the plurality of hinge pins, respectively and a wire allows the respective capstan to be rotated when the actuator drives by sequentially connecting the actuator and the respective capstans. A plurality of clutches are disposed on the plurality of hinge pins, respectively, and allow the connection links and the capstans to be rotated together, or allow the capstans to be rotated by connecting or disconnecting the ends of the connection links and the capstans, respectively.

8 Claims, 6 Drawing Sheets

APPARATUS FOR DRIVING LINKS

CROSS-REFERENCE TO RELATED APPLICATION

The present application claims priority of Korean Patent Application Number 10-2014-0059147 filed on May 16, 2014, the entire contents of which application are incorporated herein for all purposes by this reference.

BACKGROUND (a) Technical Field

The present invention relates to an apparatus for driving links, which is simplified and decreased in weight by reducing the number of necessary actuators using wire, capstan and clutch.

(b) Description of the Related Art

According to a conventional multi-joint link driving apparatus, the respective actuator operates each link at a sectional surface of the link to control the linkage. However, in this method the actuator is arranged on a connection portion of the links and thus the payload may deteriorate due to substantial weight. Further, an actuator is used at the respective link connection portion and thus product price increases due to complex structure and power consumption increases as well as failures.

The description provided above as a related art of the present invention is merely for helping in understanding the background of the present invention and should not be construed as being included in the related art known by those skilled in the art.

SUMMARY

The present invention provides an apparatus for driving links, which is simplified and decreased in weight by reducing the number of necessary actuators using wire, capstan and clutch, thereby reducing energy consumption and production cost.

In one aspect, the present invention provides an apparatus for driving links, that may include: a base onto which an actuator is installed; a plurality of connection links connected to the base via a plurality of hinge pins, and the respective end of which is connected through the hinge pin to form a series of a driving lines; a plurality of capstans disposed on the plurality of hinge pins, respectively; a wire configured to rotate the respective capstans when the actuator is driven by sequentially connecting the actuator and the respective capstan; and a plurality of clutches disposed on the plurality of hinge pins, respectively, and allow the connection links and the capstans to be rotated together, or allow the capstans to be rotated by connecting or disconnecting the ends of the connection links and the capstans, respectively.

A driving pulley may be disposed on a driving shaft of the actuator and the wire may receive the driving force via the driving pulley to rotate the respective capstans. The initial link to be connected to the base and the final link to be disposed in the last may be contained in the plurality of connection links, and a driven pulley may be disposed on the remote end of the final link and the wire may be caught over the driven pulley.

The apparatus for driving links may further include a solenoid configured to control the clutches disposed on the respective ends of the plurality of connection links. In addition, the apparatus for driving links may further include a controller configured to rotate the capstan at the corresponding location and the specific link together by operating the clutch corresponding to the end of the corresponding specific link when driving one specific driving link among the plurality of connection links.

Further, the controller may be configured to adjust the driving direction of an actuator based on the driving direction of the connection link to be driven. The wire may form a closed curve. The connection link at one side (e.g., a first side) and the connection link at the other side (e.g., a second side) that are connected to each other may be arranged to be spaced apart at a predetermined distance, and may be connected via the hinge pin wherein the capstan and the clutch may be arranged on a separate space, and the clutch may be slid along the hinge pin to connect or disconnect the capstan to the connection link at one side.

The first gear portions that are tooth-engaged with each other may be formed on the respective connection links, and the upper ends of the clutch, respectively and the second gear portion that are tooth-engaged with each other may be formed on the capstans and lower ends of the clutch, respectively. The one end of the hinge pin may be fixed to the connection link at the other side and the third gear portions that are tooth-engaged with each other may be formed on the middle portions of the hinge pin and the clutch, respectively. The first gear portions disposed at an upper end of the clutch and the connection link at one side may be maintained to be constantly in a tooth-engagement state when the clutch is slid and when the clutch is disposed at the middle of the hinge pin, the third gear portions disposed at the clutch and the hinge pin may be tooth-engaged, and when the clutch is slid toward the connection link at the other side, the second gear portions disposed at the clutch and the capstan may be tooth-engaged.

BRIEF DESCRIPTION OF THE DRAWINGS

The above and other features of the present invention will now be described in detail with reference to certain exemplary embodiments thereof illustrated by the accompanying drawings which are given hereinbelow by way of illustration only, and thus are not limitative of the present invention, and wherein.

Figure 1:
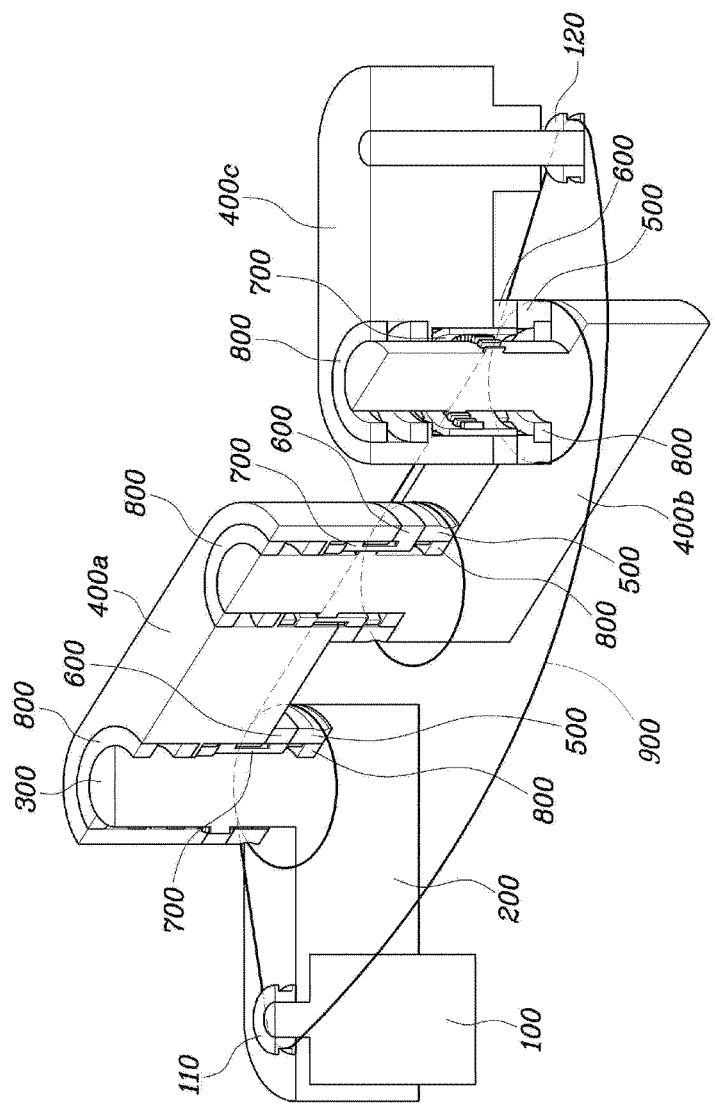
FIG. 1 is an exemplary view illustrating an apparatus for driving a connection link according to an exemplary embodiment of the present invention.

It should be understood that the appended drawings are not necessarily to scale, presenting a somewhat simplified representation of various exemplary features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor.

The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in networked coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover the exemplary embodiments as well as various alternatives, modifications, equivalents and other embodiments; which may be included within the spirit and scope of the invention as defined by the appended claims. Exemplary embodiments of an apparatus for driving a connection link according to an exemplary embodiment of the present invention are described hereafter in detail with reference to the accompanying drawings.

Figure 2:
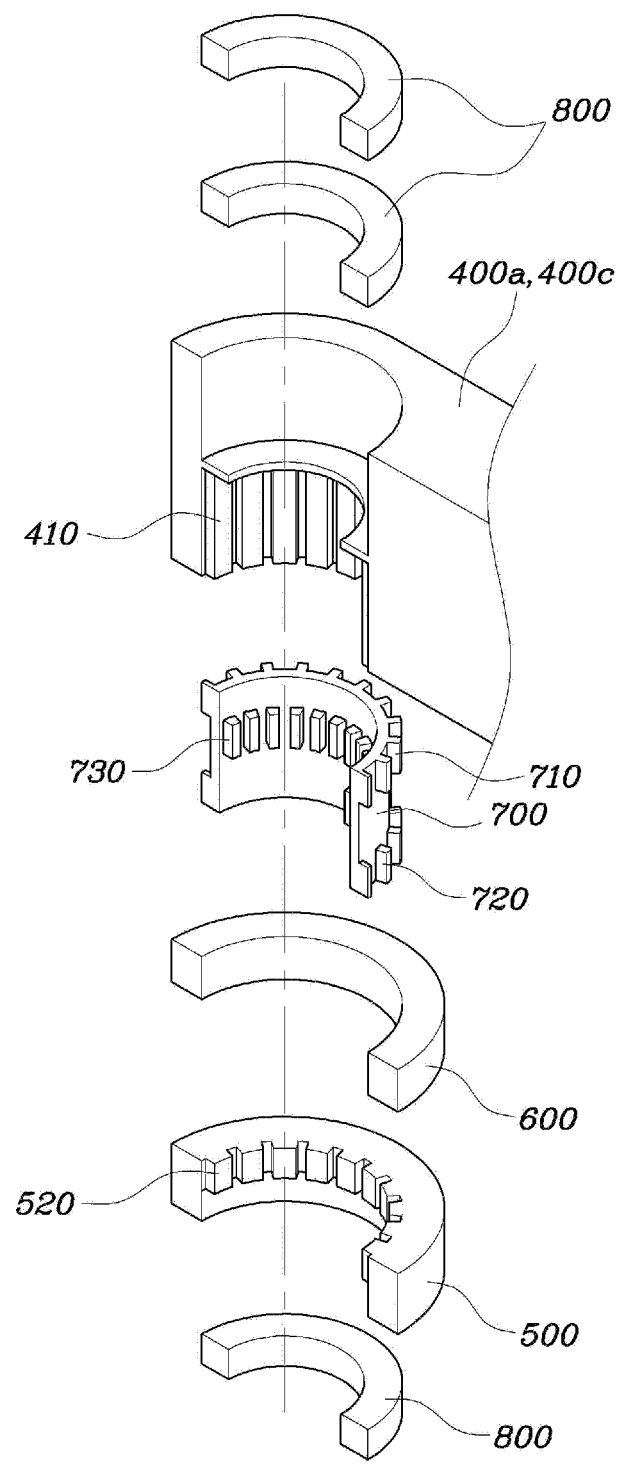
FIGS. 2 and 3 are exemplary detailed views illustrating an apparatus for driving a connection link according to an exemplary embodiment of the present invention.
Figure 3:
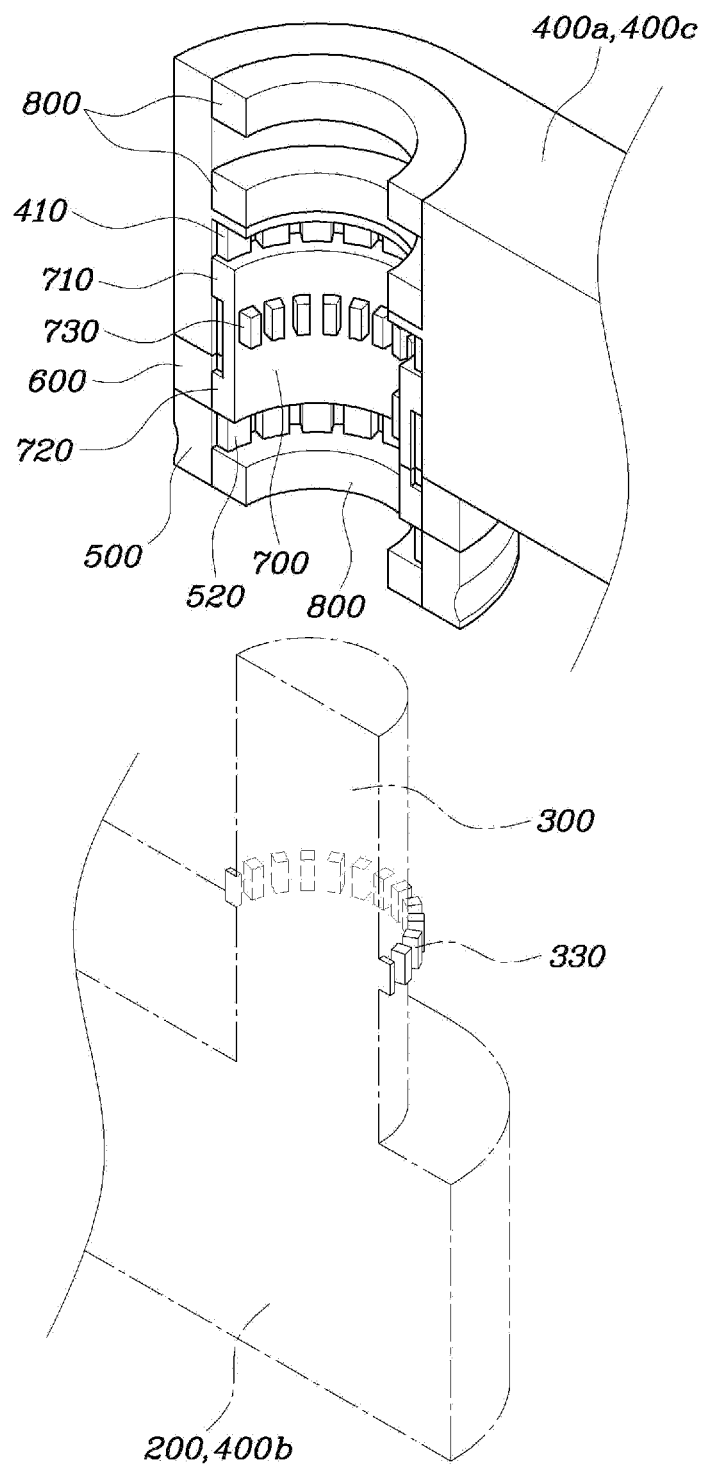
Figure 4:
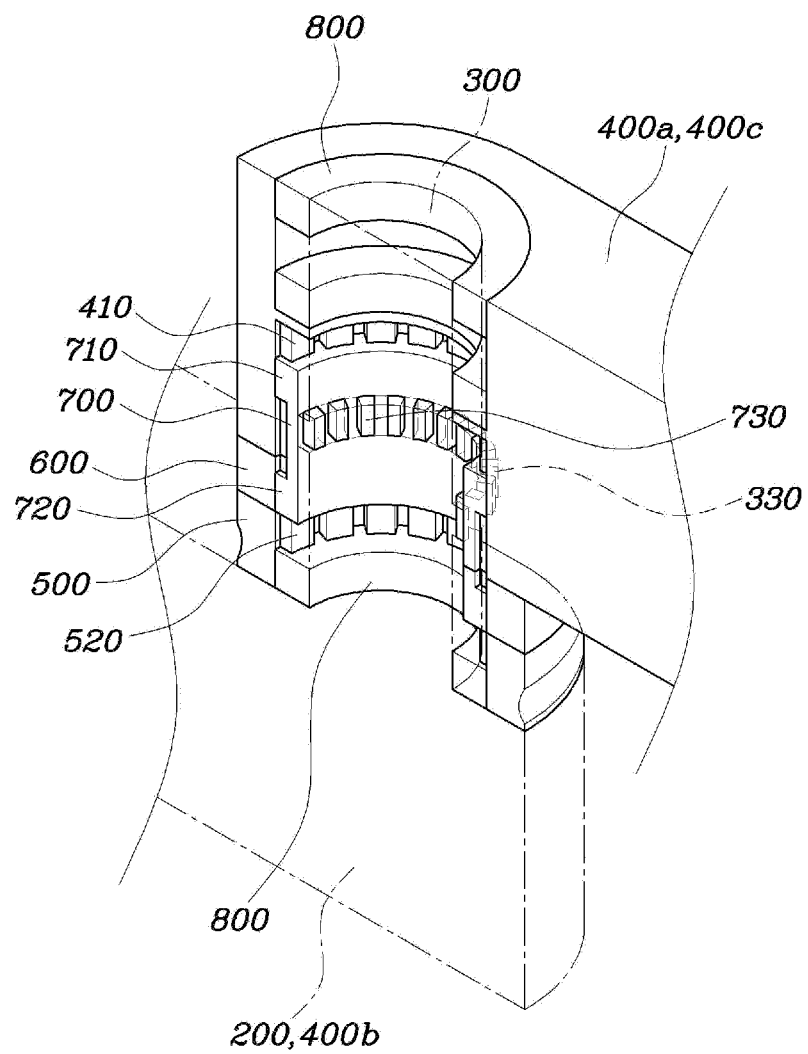
FIG. 4 is an exemplary view illustrating an apparatus for driving a connection link wherein the connection link is in a fixing state while a clutch is operated, according to an exemplary embodiment of the present invention.
Figure 5:
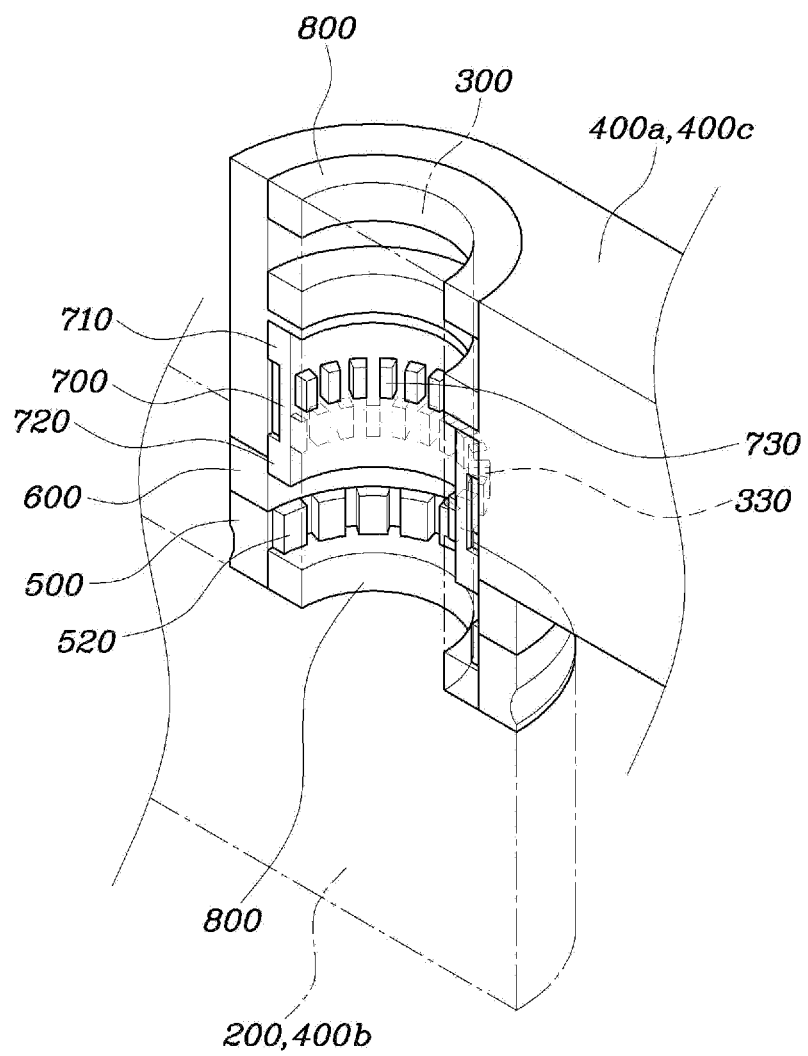
FIG. 5 is an exemplary view illustrating an apparatus for driving a connection link wherein the connection link is in a neutral state while a clutch is operated, according to an exemplary embodiment of the present invention.
Figure 6:
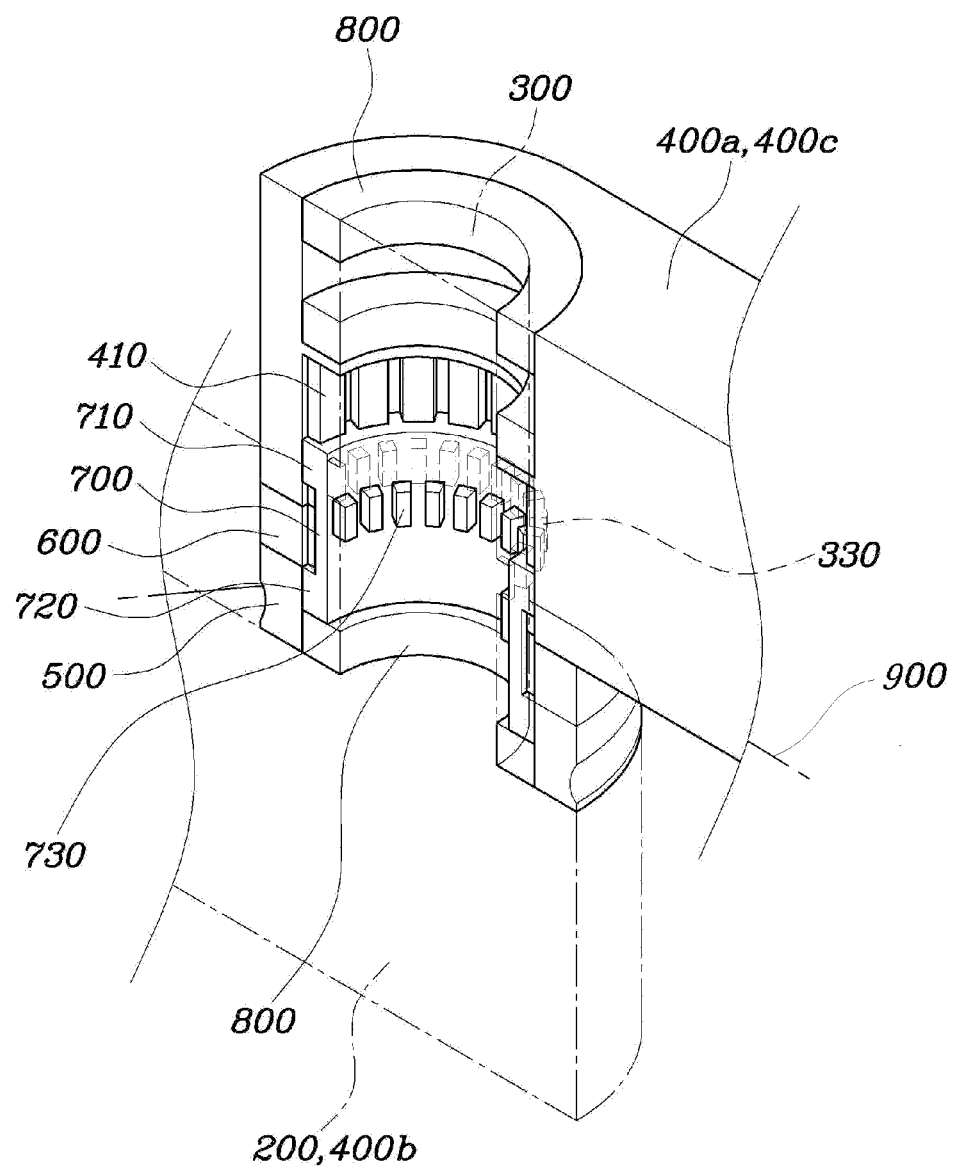
FIG. 6 is an exemplary view illustrating an apparatus for driving a connection link wherein the connection link is in a rotating state while a clutch is operated, according to an exemplary embodiment of the present invention.

FIG. 1 is an exemplary view illustrating an apparatus for driving a connection link according to an exemplary embodiment of the present invention, FIGS. 2 and 3 are exemplary detailed views illustrating an apparatus for driving a connection link according to an exemplary embodiment of the present invention, FIG. 4 is an exemplary view illustrating an apparatus for driving a connection link wherein the connection link is in a fixing state while a clutch is operated, according to an exemplary embodiment of the present invention, FIG. 5 is an exemplary view illustrating an apparatus for driving a connection link wherein the connection link is in a neutral state while a clutch is operated, according to an exemplary embodiment of the present invention, and FIG. 6 is an exemplary view illustrating an apparatus for driving a connection link wherein the connection link is in a rotating state while a clutch is operated, according to an exemplary embodiment of the present invention.

An apparatus for driving links according to an exemplary embodiment of the present invention, as shown in FIGS. 1 to 3, may include: a base 200 onto which an actuator 100 may be installed; a plurality of connection links 400a, 400b, 400c connected to the base 200 via a plurality of hinge pins 300, respectively, and the respective ends of which may be connected via the hinge pin 300 to form a series of a driving lines; a plurality of capstans 500 disposed on the plurality of hinge pins 300, respectively; a wire 900 which allows the respective capstans 500 to be rotated when the actuator 100 is driven by sequentially connecting the actuator 100 and the respective capstans 500; and a plurality of clutches 700 disposed on the plurality of hinge pins 300, respectively, and allow the connection links 400a, 400b, 400c and the capstans 500 to be rotated together, or allow the capstans 500 to be rotated by connecting or disconnecting the ends of the connection links 400 and the capstans 500, respectively.

In other words, an actuator 100 may be disposed on a first link that corresponds to the base 200 and a plurality of links 400a, 400b, 400c each end of which is connected via the hinge pins 300 to form a series of driving lines may be provided, and a clutch 700, a bearing 800 and a capstan 500 may be connected to the respective hinge pins 300. Accordingly, the capstans 500 and the ends of the connection links 400a, 400b, 400c may be connected through operations of the clutches 700, respectively, so that the connection links 400a, 400b, 400c rotate or are fixed to prevent movement (e.g., to remain unmoved).

Meanwhile, as shown in FIGS. 1 to 3, the connection link 400a at one side (e.g., a first side) and the connection link 400b at the other side (e.g., a second side) that are connected to each other may be arranged to be spaced apart at a predetermined distance, and may be connected via the hinge pin 300 wherein the capstan 500 and the clutch 700 may be arranged on a separate space. In particular, the clutch 700 may be slid along the hinge pin 300 to connect or disconnect the capstan 500 to the connection link 400a at one side. The one end (e.g., a first end) of the hinge pin 300 may be fixed to one of the connection link 400a at one side and the connection link 400b at the other side.

Further, the first gear portions 410, 710 that are tooth-engaged with each other may be formed on the respective connection links 400a, 400b, 400c and the upper ends of the clutch 700, respectively, and the second gear portion 520, 720 that are tooth-engaged each other may be formed on the capstans 500 and the upper ends of the clutch 700, respectively, and the third gear portions 330, 730 that are tooth-engaged with each other may be formed on the middle portions of the hinge pin 300 and the clutch 700, respectively.

The first gear portions 410, 710 may consist of the connection link gear teeth 410 formed along an inner circumferential surface of the connection link 400a at one side (e.g., a first side) and the first clutch gear teeth 710 disposed along an outer circumferential surface of the clutch 700 at an upper end of the clutch 700 and tooth-engaged with the connection link gear teeth 410, the second gear portions 520, 720 may consist of the capstan gear teeth 520 formed along an inner circumferential surface of the capstan 500 and the second clutch gear teeth 720 disposed along an outer circumferential surface of the clutch 700 at a lower end of the clutch 700 and tooth-engaged with the capstan gear tooth 520, and the third gear portions 330, 730 may consist of the hinge pin gear teeth 330 formed along an outer circumferential surface of the hinge pin 300 and the third clutch gear teeth 730 disposed on an inner circumferential surface of the clutch 700 and tooth-engaged with the hinge pin gear teeth 300. The first gear portions 410, 710 to the third gear portions 330, 730 may be selected by the up/down (e.g., vertical) sliding of the clutch 700 wherein the link connection may be fixed, neutral and rotated in accordance with the selection of the respective gear portions.

In more detailed description of an operation of an apparatus for driving links which form a driving line, according to an exemplary embodiment of the present invention, as shown in FIGS. 1 to 6, the first gear portions 410, 710 disposed at an upper end of the clutch 700 may be maintained constantly in a tooth-engagement state when the clutch 700 is slid and when the clutch 700 is disposed at a substantially middle of the hinge pin 300, the third gear portions 330, 730 are tooth-engaged, and when the clutch 700 is slid toward the connection link 400b at the other side (e.g., a second side) and is disposed at a lower end of the hinge pin 300, the second gear portions 520, 720 may be tooth-engaged. As described above, the first gear portions 410, 710 may be maintained constantly in a tooth-engagement state irrespective of the movement of the clutch wherein when the third gear portions 330, 730 are tooth-engaged, as shown in FIG. 4, the connection link 400a at one side (e.g., a first side) and the connection link 400b at the other side (e.g., a second side) may be connected to be in a fixing state with each other.

Furthermore, as shown in FIG. 5, the third clutch gear teeth 730 may be separated to an upper side of the hinge pin gear teeth 330 while the clutch 700 is slid upward, the capstan 500 is not connected to anywhere (e.g., may be disconnected), the power from the actuator 100 may not be transmitted to the connection link 400a at one side, and the connection link 400a at one side and the connection link 400b at the other side may be disconnected to form a neutral state. As shown in FIG. 6, when the third clutch gear teeth 730 is disposed at a lower side of the hinge pin gear teeth 330 while the clutch is slid downward, the second gear portions 520, 720 may be tooth-engaged and thus the power from the actuator 100 may rotate the connection link 400a at one side via the wire 900 and the capstan 500. In more detailed description of the power transmission path of the actuator 100, as shown in FIG. 1, a driving pulley 110 may be disposed on a driving shaft of the actuator 100 and the wire 900 may be configured to receive the driving force through the driving pulley 110 to rotate the respective capstans 500.

Further, with respect to the initial link to be connected to the base 200 and the final link 400c to be disposed in the last among the plurality of connection links 400a, 400b, 400c, a driven pulley 120 may be disposed on the remote end of the final link 400c and the wire 900 may be caught over the driven pulley 120. In particular, the initial link may be the connection link 400a at one side but may be another connection link that may be further provided separately between the base 200 and the connection link 400a at one side. The wire 900 may form a closed curve and thus may change the direction to which the tension of the wire 900 applies and at this time the driven pulley 120 disposed on the final link 400c may be configured to change the direction to which the tension of the wire 900 applies.

Moreover, as shown in FIG. 1, the apparatus for driving the links of the present invention may further include a solenoid 600 configured to control the clutches 700 disposed on the respective ends of the plurality of links 400 and may further include a controller (not shown) configured to rotate the capstan 500 at the corresponding location and the specific link together by operating the clutch 700 that corresponds to the end of the corresponding specific link when driving one specific driving link among the plurality of connection links 400a, 400b, 400c.

In other words, the end of the respective connection links 400a, 400b, 400c may be connected to the capstan 500 that receives power from the actuator 100 via the wire 900 to move the corresponding connection links to thus drive the respective connection links 400a, 400b, 400c, and thus the solenoid 600 may be configured to move the clutch 700 to a necessary location and the controller may be configured to adjust the movement of the clutch 700 by sending a control signal to the solenoid 600.

Further, the controller may be configured to adjust the driving direction of the actuator 100 based on the driving direction of the specific link to be driven and adjust the direction of the specific direction by sending a control signal to the solenoid 600 that corresponds to the end of the respective connection links 400a, 400b, 400c in accordance with the driving direction of the specific link.

In the present exemplary embodiment even though the relation between the connection link 400a at one side (e.g., a first side) and the connection link 400b at the other side (e.g., a second side) is described as an exemplary embodiment, it may be applied identically to the driving and connection relations of the base 200 and the connection link 400a at one side, and the connection link 400b at the other side and the final link 400c, and thus the connection links 400a, 400b, 400c may be increased continuously or decreased. Further, the first gear portions 410, 710, the second gear portions 520, 720 and the third gear portions 330, 730 may be provided with a friction means at a contact surfaces of the respective gear portions, instead of the power transmission through the gear tooth, to transmit power through the frictional contact between the gear portions.

According to the apparatus for driving the links as configured above, the same effect as independently controlling links using each actuator may be obtained through the control of one actuator 100 mounted on the base 200 and the clutch disposed on the respective ends of the links. In addition, since only one actuator is used, electric power consumption and the payload due to self-weight may be reduced and an apparatus for driving links may be simplified and reduced in weight.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. An apparatus for driving links, comprising:
a base onto which an actuator is installed;
a plurality of connection links connected to the base via a plurality of hinge pins, and the respective end of which is connected through the hinge pin to form a series of a driving lines;
a plurality of capstans disposed on the plurality of hinge pins, respectively;
a wire that allows the respective capstans to be rotated when the actuator drives by sequentially and directly connecting the actuator and the respective capstan; and
a plurality of clutches disposed on the plurality of hinge pins, respectively, and allow the connection links and the capstans to be rotated together, or allow the capstans to be rotated by connecting or disconnecting the ends of the connection links and the capstans, respectively,
wherein the connection link at a first side and the connection link at a second side that are connected to each other are arranged to be spaced apart at a predetermined distance, and are connected via the hinge pin, wherein the capstan and the clutch are arranged on a separate space, and the clutch is slid along the hinge pin to connect or disconnect the capstan to the connection link at one side,
first gear portions that are tooth-engaged with each other are formed on the respective connection links and upper ends of the clutch, respectively, and second gear portions that are tooth-engaged with each other are formed on the capstans and lower ends of the clutch, respectively, and
one end of the hinge pin is fixed to the connection link at the second side, and third gear portions that are tooth-engaged with each other are formed on middle portions of the hinge pin and the clutch, respectively.

2. The apparatus of claim 1, wherein a driving pulley is disposed on a driving shaft of the actuator and the wire is configured to receive the driving force through the driving pulley to rotate the respective capstans.

3. The apparatus of claim 1, wherein the initial link to be connected to the base and the final link to be disposed in the last are contained in the plurality of connection links, and a driven pulley is disposed on the remote end of the final link and the wire is caught over the driven pulley.

4. The apparatus of claim 1, further comprising:
a solenoid configured to control the clutches disposed on the respective ends of the plurality of connection links.

5. The apparatus of claim 1, further comprising:
a controller configured to rotate the capstan at the corresponding location and the specific link together by operating the clutch that corresponds to the end of the corresponding specific link when driving one specific driving link among the plurality of connection links.

6. The apparatus of claim 5, wherein the controller is configured to adjust the driving direction of an actuator in accordance with the driving direction of the connection link to be driven.

7. The apparatus of claim 1, wherein the wire forms a closed curve.

8. The apparatus of claim 1, wherein the first gear portions disposed at an upper end of the clutch and the connection link at the first side are maintained constantly in a tooth-engagement state, when the clutch is disposed at the middle of the hinge pin, the third gear portions disposed at the clutch and the hinge pin are tooth-engaged with each other, and when the clutch is slid toward the connection link at the other side, the second gear portions disposed at the clutch and the capstan are tooth-engaged with each other.

* * * * *